US010656888B1

(12) United States Patent
Coulter et al.

(10) Patent No.: US 10,656,888 B1
(45) Date of Patent: May 19, 2020

(54) RASTER IMAGE PROCESSOR ALLOCATION SCHEME

(71) Applicants: Justin J. Coulter, Longmont, CO (US); David Ward, Broomfield, CO (US)

(72) Inventors: Justin J. Coulter, Longmont, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/286,936

(22) Filed: Feb. 27, 2019

(51) Int. Cl.
*G06F 3/12* (2006.01)
*G06K 15/02* (2006.01)

(52) U.S. Cl.
CPC ............ *G06F 3/126* (2013.01); *G06F 3/1213* (2013.01); *G06F 3/1219* (2013.01); *G06K 15/1859* (2013.01)

(58) Field of Classification Search
None
See application file for complete search history.

(56) References Cited

U.S. PATENT DOCUMENTS

| 6,327,050 | B1 | 12/2001 | Motamed et al. |
| 6,816,276 | B2 | 11/2004 | Sugano |
| 7,339,687 | B2 | 3/2008 | Ferlitsch |
| 8,125,677 | B2 | 2/2012 | Shestak et al. |
| 8,149,427 | B2 | 4/2012 | Inoue et al. |
| 8,325,372 | B2 | 12/2012 | Klassen |
| 8,665,469 | B2 | 3/2014 | Klassen et al. |
| 8,693,016 | B2 | 4/2014 | Ward et al. |
| 8,713,576 | B2 | 4/2014 | Panziera |
| 9,202,149 | B2 | 12/2015 | Hara |
| 2002/0163664 | A1* | 11/2002 | Sugano .............. G06K 15/1857 358/1.15 |
| 2008/0270402 | A1* | 10/2008 | Inoue .................... G06F 3/1212 |
| 2018/0082160 | A1 | 3/2018 | Nakane et al. |

FOREIGN PATENT DOCUMENTS

CN 102336071 A 2/2012
JP 5928883 B2 6/2016

OTHER PUBLICATIONS

Beretta et al., Font rendering on a GPU-based raster image processor; The International Society for Optical Engineering; Jan. 2010.

* cited by examiner

*Primary Examiner* — Lennin R Rodriguezgonzalez
(74) *Attorney, Agent, or Firm* — Duft & Bornsen, PC

(57) ABSTRACT

Embodiments herein describe RIP allocation schemes that consider a number of factors during page scheduling to improve the performance of a print controller. One embodiment comprises an apparatus that includes a plurality of RIPs collectively comprising a total number of RIPs that process logical pages. The apparatus further includes a scheduler. The scheduler receives a print job, determines that a number of available RIPs of the plurality of RIPs to process logical pages in the print job is less than the total number of RIPs, and to iteratively increase a number of the logical pages in the print job that are assigned to each of the available RIPs as the number of available RIPs increases over time.

20 Claims, 9 Drawing Sheets

| SCHEDULING ROUND | AVAILABLE RIPS | LOGICAL PAGES ALLOCATED TO EACH RIP |
|---|---|---|
| 1 | NODE 102-1: RIP 104-1<br>NODE 102-1: RIP 104-3 | 5<br>5 |
| 2 | NODE 102-1: RIP 104-1 (WORKING ON ROUND 1 PAGES)<br>NODE 102-1: RIP 104-3 (WORKING ON ROUND 1 PAGES)<br>NODE 102-1: RIP 104-2 (DONE WITH PRIOR JOB)<br>NODE 102-2: RIP 104-1 (DONE WITH PRIOR JOB) | 10<br>10<br>10<br>10 |
| 3 | NODE 102-1: RIP 104-1 (WORKING ON ROUND 2 PAGES)<br>NODE 102-1: RIP 104-3 (WORKING ON ROUND 2 PAGES)<br>NODE 102-1: RIP 104-2 (WORKING ON ROUND 1 PAGES)<br>NODE 102-2: RIP 104-1 (WORKING ON ROUND 1 PAGES)<br>NODE 102-2: RIP 104-3 (DONE WITH PRIOR JOB)<br>NODE 102-2: RIP 104-4 (DONE WITH PRIOR JOB)<br>NODE 102-1: RIP 104-4 (DONE WITH PRIOR JOB)<br>NODE 102-N: RIP 104-1 (DONE WITH PRIOR JOB) | 20 PAGES<br>20 PAGES<br>20 PAGES<br>20 PAGES<br>20 PAGES<br>20 PAGES<br>20 PAGES<br>20 PAGES |
| 4 | 16 RIPS | 40 PAGES EACH |
| 5 | 32 RIPS (TOTAL NUMBER OF RIPS AT PRINT CONTROLLER 100) | 80 PAGES EACH (MAXIMUM NUMBER OF ASSIGNABLE PAGES TO ANY ONE RIP) |
| 6 | 32 RIPS | 80 PAGES EACH |
| 7 | 32 RIPS | 80 PAGES EACH |

RASTER IMAGE PROCESSOR ALLOCATION SCHEME

FIELD

This disclosure relates to the field of printing systems, and in particular, to print controllers that interpret and rasterize incoming print jobs.

BACKGROUND

In the field of printing, it is generally desirable to maximize not just printing quality, but also printing speed at a printer. Customers tend to dislike any delay that occurs between sending a print job to a printer, and receiving the printed sheets of the print job. Therefore, printer manufacturers strive to optimize not only the physical printing speed of marking engines that mark printed sheets, but also the processing speed of devices that prepare incoming print jobs for printing by interpreting and rasterizing them.

In order to increase the processing speed for incoming print data, print controllers often include multiple Raster Image Processors (RIPs) that operate in parallel. The print controller splits the incoming print job into groups of logical pages, and sends the groups of logical pages to different parallel RIPs for interpretation and rasterization.

RIPs are a finite resource, and the availability of a particular RIP at any given time for processing a print job may change as print jobs are processed by the print controller. For example, it's unlikely that all of the RIPs that operate on the print controller will become available at the same time for processing the next print job in a series of print jobs. Thus, some RIPs may be processing a prior print job while other RIPs become available to process the next print job. Further, some portions of a print job may entail more processing than others, which can cause the RIPs processing those portions to become overloaded and possibly, prevent those portions of the print job from being ready when they are needed during the printing process.

SUMMARY

Embodiments herein describe RIP allocation schemes that consider a number of factors during page scheduling to improve the performance of a print controller. In some embodiments, the number of RIPs available to process a print job is increasing over time, and smart page scheduling can adjust for this case. In other embodiments, the pages in a print job vary in complexity, color management instructions, and/or have imposition differences (e.g., a simplex print job being printed on a duplex print engine), and smart page scheduling can adjust for these cases as well.

One embodiment comprises an apparatus that includes a plurality of RIPs collectively comprising a total number of RIPs that process logical pages. The apparatus further includes a scheduler. The scheduler receives a print job, determines that a number of available RIPs of the plurality of RIPs to process logical pages in the print job is less than the total number of RIPs, and to iteratively increase a number of the logical pages in the print job that are assigned to each of the available RIPs as the number of available RIPs increases over time.

Another embodiment comprises a method of progressive page loading of RIPs. The method comprises receiving a print job, determining that a number of available RIPs to process logical pages in the print job is less than a total number of RIPs that are configured to process logical pages for print jobs, and iteratively increasing a number of the logical pages in the print job that are assigned to each of the available RIPs as the number of available RIPs increases over time.

Another embodiment comprises a non-transitory computer-readable medium embodying programmed instructions which, when executed by one or more processors, directs the one or more processors to receive a print job, determine that a number of available RIPs to process logical pages in the print job is less than a total number of RIPs that are configured to process logical pages for print jobs, and to iteratively increase a number of the logical pages in the print job that are assigned to each of the available RIPs as the number of available RIPs increases over time.

The above summary provides a basic understanding of some aspects of the specification. This summary is not an extensive overview of the specification. It is intended to neither identify key or critical elements of the specification nor delineate any scope of the embodiments of the specification, or delineate any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

FIG. 3 depicts a page assignment scheduling table in an illustrative embodiment.

DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

A RIP scheduler in the most performance-optimal case has all available system RIPs ready to accept pages in a print job at the start of the print job. To achieve optimal performance for the print job with all pages having equal complexity and constant color management exceptions, a round-robin page scheduling mechanism is usually sufficient. When round-robin page scheduling is employed on print jobs with pages of mixed complexity and/or a substantial number of color management exceptions, the RIPs can become overloaded, resulting in sub-optimal performance. Most print controllers prevent overloading of its RIPs by waiting until a RIP has completed rasterization of its assigned page before assigning it another page. However, this approach does not allow the print controller to take advantage of the multitasking (simultaneous interpreting and rendering) capabilities of the RIPs. When a RIP is given multiple pages to work on at a time, the RIP performance can be improved significantly (e.g., up to 2-3 times faster for some print jobs). Therefore, a good RIP scheduler will determine how to schedule the next print job's pages using multiple weighting factors when only a subset of the total RIPs in the system are available to accept pages, while also making adjustments as more RIPs gradually becoming available (e.g., as the previous job's pages are completed by the RIPs).

In the embodiments described herein, each available RIP is progressively loaded with pages when all of the RIPs are not available at the beginning of the job to achieve optimal performance. As more RIPs become available for scheduling, then additional weighting factors may come into play for scheduling page assignments to the RIPs, such as page complexity, page color management instructions, and/or page imposition information.

Figure 1:
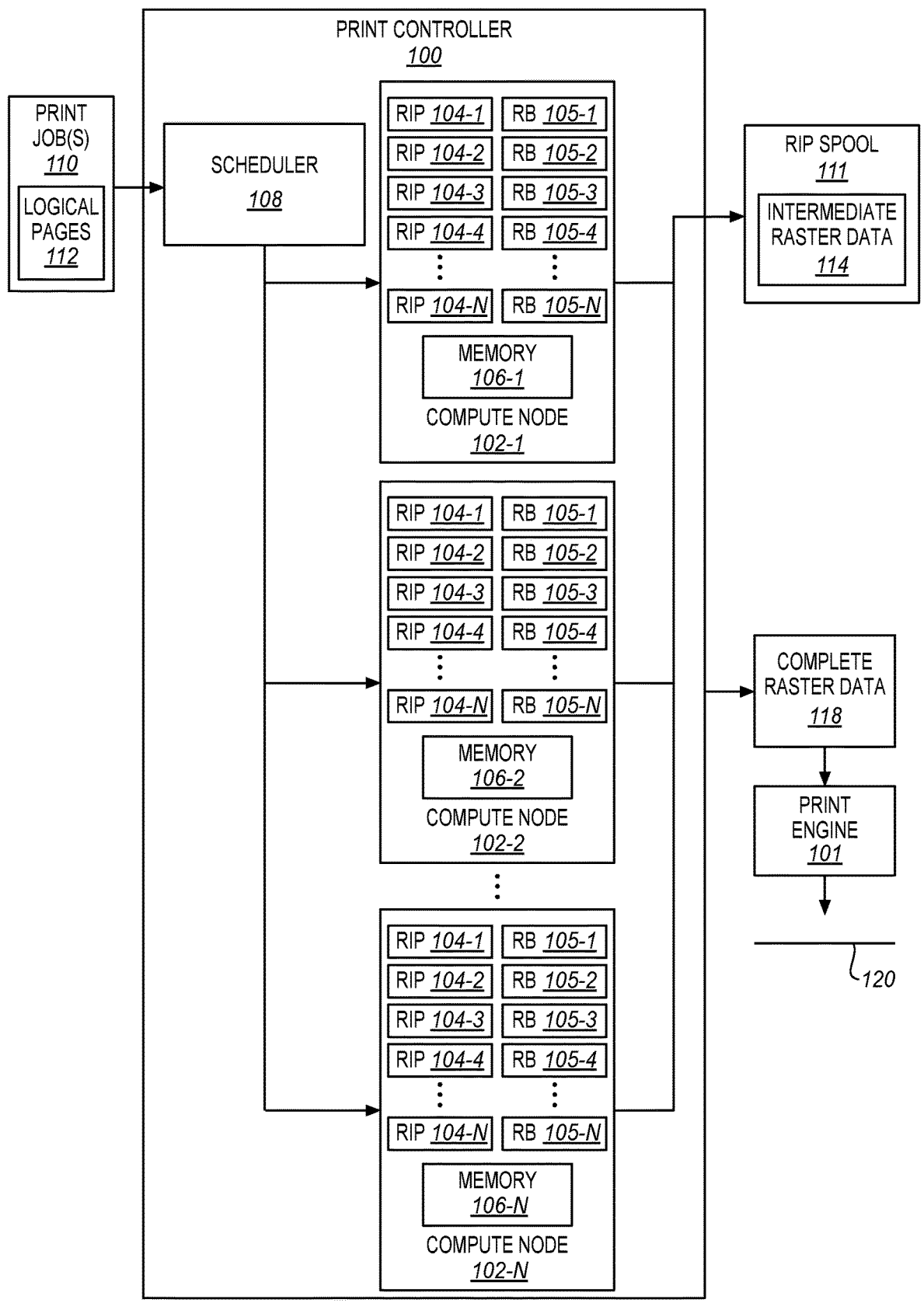
FIG. 1 is a block diagram of a print controller, a print engine, and a RIP spool in an illustrative embodiment.

FIG. 1 is block diagram of a print controller 100 (i.e., an apparatus), a print engine 101, and a RIP spool 111 in an illustrative embodiment. In some embodiments, print controller 100 may be referred to as a Digital Front End (DFE). Print controller 100 may operate outside of a printing system as a separate element in some embodiments, or may be included within a printing system in other embodiments. Further, print controller 100 may be included within print engine 101 in some embodiments. RIP spool 111 may be included within print controller 100 in some embodiments or separate and communicatively coupled to print controller 100 in other embodiments.

While the specific hardware implementation of print controller 100 is subject to design choices, print controller 100 may comprise any electronic circuits and/or optical circuits that are able to perform the functions described herein for print controller 100. Print controller 100 may include one or more Central Processing Units (CPU), Graphics Processing Units (GPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

Print controller 100 and RIP spool 111 may further comprise any electronic circuits, and/or optical circuits, and/or magnetic circuits that are able to store data. For instance, print controller 100 and/or RIP spool 111 may include one or more volatile or non-volatile Dynamic Random-Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

In this embodiment, print controller 100 includes a plurality of compute nodes 102, each of which include a plurality of RIPs 104, a plurality of Raster Builders (RB) 105, and a memory 106. RIPs 104 may process (e.g., interpret and/or rasterize) logical pages 112 in parallel or substantially in parallel. RIPs 104 may be implemented in hardware, firmware, or a combination of hardware and firmware. RIPs 104 comprise any component, system, or device that interprets and rasterizes print jobs(s) 110 to generate intermediate raster data 114, which may be stored at RIP spool 111 prior to printing, or may be distributed to RBs 105 for final assembly of sheet side images which may be transmitted by print controller 100. The sheet side images may then be received by print engine 101 for printing.

As described herein, intermediate raster data 114 is subject to further processing prior to printing. For example, intermediate raster data 114 may comprise raster data for logical pages 112, which are distributed to RBs 105 for assembly into sheet side images to form complete raster data 118. RB's 105 may process (e.g., assemble) raster data for logical pages 112 in parallel or substantially in parallel. Complete raster data 118 may be transmitted by print controller 100 or scheduler 108. Complete raster data 118 may be received by print engine 101 for processing and printing.

Memory 106 may comprise any electronic circuits, and/or optical circuits, and/or magnetic circuits that are able to store data. For example, memory 106 may temporarily cache portions of intermediate raster data 114 used by RBs 105 to assemble the sheet side images.

RBs 105 may be implemented in hardware, firmware, or combinations of hardware and firmware. RBs 105 comprise any component, system, or device that processes intermediate raster data 114 to generate complete raster data 118 for print engine 101. RBs 105 may, for example, assemble rasterized pages into sheet side images in order to generate complete raster data 118 to be transmitted. For example, print engine 101 may receive complete raster data 118 and process complete raster data 118 for printing. RBs 105 may assemble rasterized pages into sheet side images using intermediate raster data 114 stored at RIP spool 111, or by receiving intermediate raster data 114 from one or more RIPs 104 during a printing process that does not store intermediate raster data 114 on RIP spool 111.

Print engine 101 comprises any system, component, or device that marks a medium 120 with one or more colorants. The colorants may comprise toner, liquid inks, wax, or any material suitable to mark medium 120. Medium 120 may be continuous form or cut sheet, as desired. Medium 120 may comprise paper, textile, plastic, or any tangible substrate suitable for marking with a colorant. Print engine 101 may comprise one or more marking engines as a matter of design. For example, print engine 101 may comprise a marking engine on each side of medium 120. Print engine 101 may receive complete raster data 118 for printing (e.g., print engine 101 may mark at least one colorant onto medium 120 based on complete raster data 118 received by print engine 101).

In this embodiment, print controller 100 further includes a scheduler 108, which is communicatively coupled to compute nodes 102. Scheduler 108 may be implemented by one or more compute nodes 102 in some embodiments. Scheduler 108 receives print job(s) 110 and distributes/assigns logical pages 112 of print job(s) 110 to compute nodes 102 and/or RIPs 104 for rasterization. For instance, logical pages 112 are distributed to compute nodes 102 for processing by their respective RIPs 104. In the embodiments described herein, scheduler 108 assigns logical pages 112 to RIPs 104 based on a number of factors, which will become more readily apparent in the following discussion. In some embodiments, scheduler 108 may perform interpretation of print job 110 to identify logical pages 112. In some embodiments, logical pages 112 are distributed to the assigned compute nodes 102 and/or RIPs 104 in blocks of multiple logical pages 112.

Figure 2:
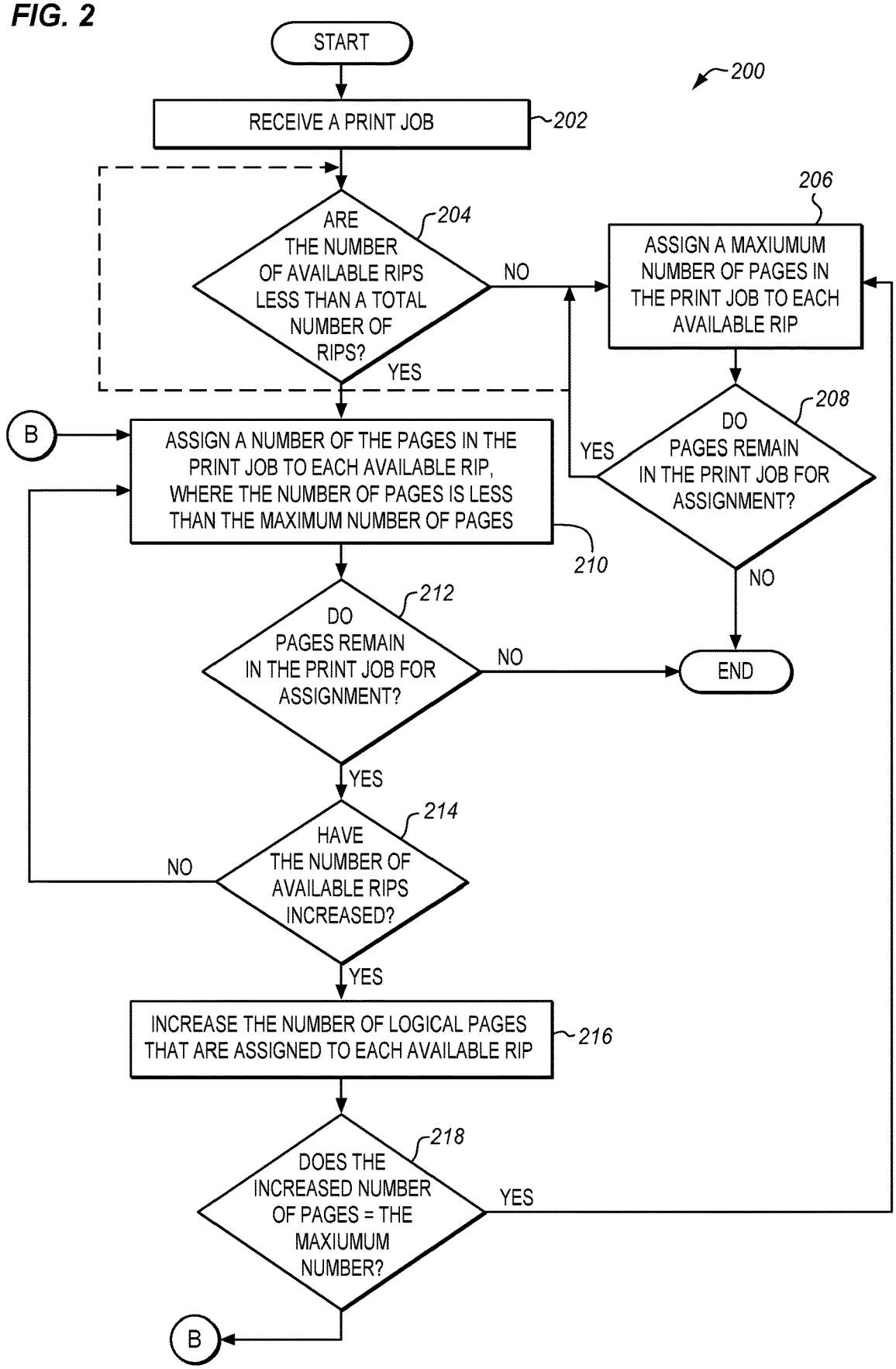
FIG. 2 is a flow chart of a method of progressive page loading of RIPs in an illustrative embodiment.

Consider that print controller 100 is operational and ready to begin processing print job(s) 110. FIG. 2 is a flow chart of a method 200 of progressive page loading of RIPs in an illustrative embodiment. Method 200 will be discussed with respect to print controller 100 of FIG. 1, although method 200 may be performed by other systems, not shown. The steps of the flow charts described herein may include other steps that are not shown. Also, the steps of the flow charts described herein may be performed in an alternate order.

Scheduler 108 receives print job 110 (see FIG. 2, step 202). Print job 110 may utilize a Page Description Language (PDL) to describe print data in print job 110. Some examples of a PDL include the Portable Document Format (PDF), an Intelligent Printer Data Stream (IPDS), etc. Print job 110 may include job tickets in some embodiments, which provide a mechanism for specifying instructions for processing print job 110.

Scheduler 108 determines if the number of RIPs 104 that are available to process print job 110 is less than a total number of RIPs 104 that are present at print controller 100 (see FIG. 2, step 204). The total number of RIPs 104 that are present at print controller 100 may be detected by print controller 100, inputted to print controller 100, determined from a stored value or any combination of the foregoing. For example, compute nodes 102 collectively may provide a total number of RIPs 104 for processing pages in print jobs 110 (e.g., thirty-two), with the availability of any particular RIP 104 depending on whether that RIP 104 is processing pages for a previous job. Generally, once a RIP 104 is assigned pages for a particular job, that RIP 104 may remain in a pool of RIPs 104 that are repeatedly assigned pages in that job until the job is finished being processed by RIPs 104. A RIP 104 may be available, for example, when it can accept a new page for processing. Accepting a new page for processing may occur when its previously assigned pages have been interpreted, rendered, or some combination of interpretation and rendering. Print controller 100 and/or scheduler 108 may determine RIPs 104 that are available by analyzing RIPs 104 status data, RIPs 104 processing queue data and/or other suitable data from compute nodes 102 and/or RIPs 104. In some embodiments, RIP 104 may become available for new pages when a threshold number of previously assigned pages to RIP 104 have been interpreted or remain to be interpreted. In other embodiments, RIP 104 may become available for new pages when a threshold number of the previously assigned pages to RIP 104 have been rasterized or remain to be rasterized.

If the number of available RIPs 104 is equal to the total number of RIPs 104 at print controller 100 (e.g., thirty-two) then scheduler 108 may assign a maximum number of logical pages 112 in print job 110 to RIPs 104 that are available (see FIG. 2, step 206). For instance, it may be pre-determined that the maximum number of pages that may be assigned to any one RIP 104 is eighty pages. Therefore, scheduler 108, in response to determining that the number of available RIPs 104 is equal to the total number of RIPs 104, may assign eighty of logical pages 112 in print job 110 to each of RIPs 104 in print controller 100. Scheduler 108, in response to assigning the maximum number of logical pages 112 to each RIP 104, repetitively assigns the maximum number of logical pages 112 to each RIP 104 until all of logical pages 112 in print job 110 have been assigned (see FIG. 2, step 208). In one embodiment, scheduler 108, in response to determining that logical pages 112 remain for assignment (see FIG. 2, step 208), may perform step 204. If no logical pages 112 remain for assignment, then method 200 ends.

If the number of available RIPs 104 is less than the total number of RIPs 104 at print controller 100, then scheduler 108 assigns a number of logical pages 112 (e.g., a block of logical pages 112) in print job 110 that is less than the maximum number of pages to each RIP 104 that is available (see step 210). For instance, if the maximum number of pages that are assignable to RIPs 104 is eighty, then scheduler 108 assigns less than eighty pages (e.g., five pages) to each RIP 104 that is available to accept new pages. In this fashion, blocks of pages may be distributed to each RIP 104 at each round (e.g., FIG. 2, step 210 and step 206). Distributing blocks of pages in this fashion may be, for example, a block-cyclic distribution.

Scheduler 108 determines if logical pages 112 remain in print job 110 for assignment (see FIG. 2, step 212). If no more logical pages 112 remain for assignment, then method 200 ends. However, if logical pages 112 remain for assignment, then scheduler 108 determines if the number of RIPs 104 that are available has increased (see FIG. 2, step 214). If the number of RIPs 104 that are available has not increased, then scheduler 108 assigns the same number of pages to each RIP 104 that is available (see FIG. 2, step 210). If scheduler 108 determines that the number of RIPs 104 that are available has increased, then scheduler 108 increases the number of logical pages 112 (e.g., a size of a block of logical pages 112) assigned to each RIP 104 that is available (see FIG. 2, step 216). In one embodiment, the increase in the number of logical pages 112 may be proportional to or a multiple of the number of available RIPs 104.

Scheduler 108 determines if the number of pages assigned to RIPs 104 that are available is the maximum number of pages that may be assigned (see FIG. 2, step 218). For instance, if the number of pages assigned has increased up to the maximum number of pages (e.g., eighty pages), then processing continues to step 206 to assign the maximum number of logical pages 112 to each RIP 104 that is available. Scheduler 108 checks if logical pages 112 remain in print job 110 for assignment. If logical pages 112 remain in print job 110 for assignment, then scheduler 108 repetitively assigns the maximum number of logical pages 112 (see step 206) and processes print job 110 until no more logical pages 112 remain for assignment to RIPs 104 that are available (see FIG. 2, step 208). In an embodiment, scheduler 108, in response to determining that logical pages 112 remain for assignment (see FIG. 2, step 208), may perform step 204. If no logical pages 112 remain for assignment, then method 200 ends.

If scheduler 108 determines in step 218 that less than the maximum number of pages have been assigned in this round, then scheduler 108 performs step 210 to assign the increased number of logical pages 112 to each RIP 104 that is available. Scheduler 108 iteratively assigns an increasing number of pages to RIPs 104 that are available as more RIPs 104 become available until no more logical pages 112 remain for assignment (see steps 210-218).

FIG. 3 depicts a page assignment scheduling table 302 in an illustrative embodiment. FIG. 3 is merely one possible example of how scheduler 108 may iteratively assign logical pages 112 in print job 110 to RIPs 104 as more of RIPs 104 become available over time. In round one, scheduler 108 determines that two RIPs 104 are available for page assignments, and scheduler 108 assigns five pages (e.g., a block of five pages) to each of RIPs 104 that are available. In round two, scheduler 108 determines that two additional RIPs 104 have become available, and assigns ten pages to each of the RIPs 104 in the pool (e.g., RIPs 104 from round one and the newly added RIPs 104 in round two). In round three, scheduler 108 determines that four additional RIPs 104 have become available, and assigns twenty pages (e.g., a block of twenty pages) to each RIP 104. In round four, scheduler 108 determines that sixteen RIPs 104 are available, and assigns forty pages to each RIP 104. In round five, scheduler 108 determines that thirty-two RIPs 104 are available, which is the total number of RIPs 104 in print controller 100 in this example. In response, scheduler 108 assigns the maximum number of pages to each RIP 104 in print controller 100, which is eighty pages in this example. The rounds continue until no more of logical pages 112 remain in print job 110 for assignment. Although only seven rounds are illustrated in FIG. 3, scheduler 108 may utilize fewer rounds or more rounds until no more of logical pages 112 in print job 110 remain for assignment to RIPs 104 that are available to accept pages.

Progressive loading of RIPs 104 has been found through testing to improve the overall throughput of the interpretation and rasterization process when the number of RIPs 104 that are available at the start of processing for a job is less than the total number of RIPs 104 installed at print controller 100.

In some embodiments, progressive loading of RIPs 104 may include more job analysis to perform smart scheduling and increase the throughput of the interpretation and rasterization process at print controller 100. For instance, during scheduling round processing (see FIG. 3), other factors may be used to allocate logical pages 112 to each RIP 104 that is available. Therefore, the progressive page loading of RIPs 104 described with respect to FIGS. 2-3 may be combined with additional factors in some embodiments (e.g., page complexity, color management instructions, imposition exceptions, etc.). Further, these additional factors have some factors prioritized over other factors in some embodiments. In other embodiments, smart scheduling may be performed using job analysis without being combined with progressive loading. The various mechanism for smart scheduling based on job analysis will be discussed below.

Figure 4:
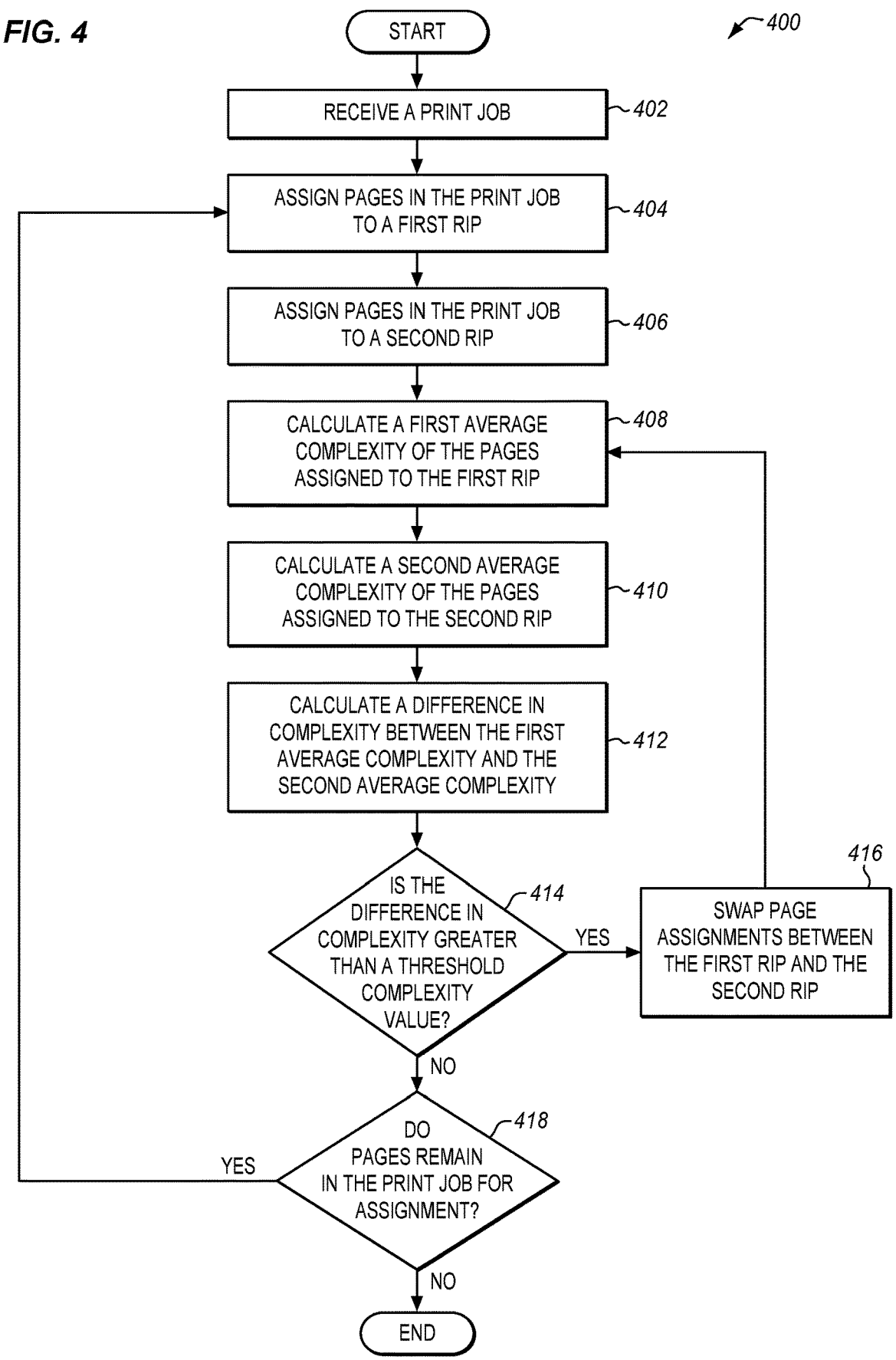
FIG. 4 is a flow chart of a method of RIP scheduling based on page complexity in an illustrative embodiment.

FIG. 4 is a flow chart of a method 400 of RIP scheduling based on page complexity in an illustrative embodiment. Method 400 will be discussed with respect to print controller 100 of FIG. 1, although method 400 may be performed by other systems, not shown.

Referring to FIG. 4, scheduler 108 receives print job 110 for processing (see FIG. 4, step 402). Step 402 may be similar to step 202 of FIG. 2, previously described. Scheduler 108 assigns one or more of logical pages 112 to a first RIP 104 that is available for processing pages (see FIG. 4, step 404) and assigns one or more of logical pages 112 to a second RIP 104 that is available for processing pages (see FIG. 4, step 406). Step 406 may be performed, for example, in an initial round of scheduling page assignments.

Figure 5:
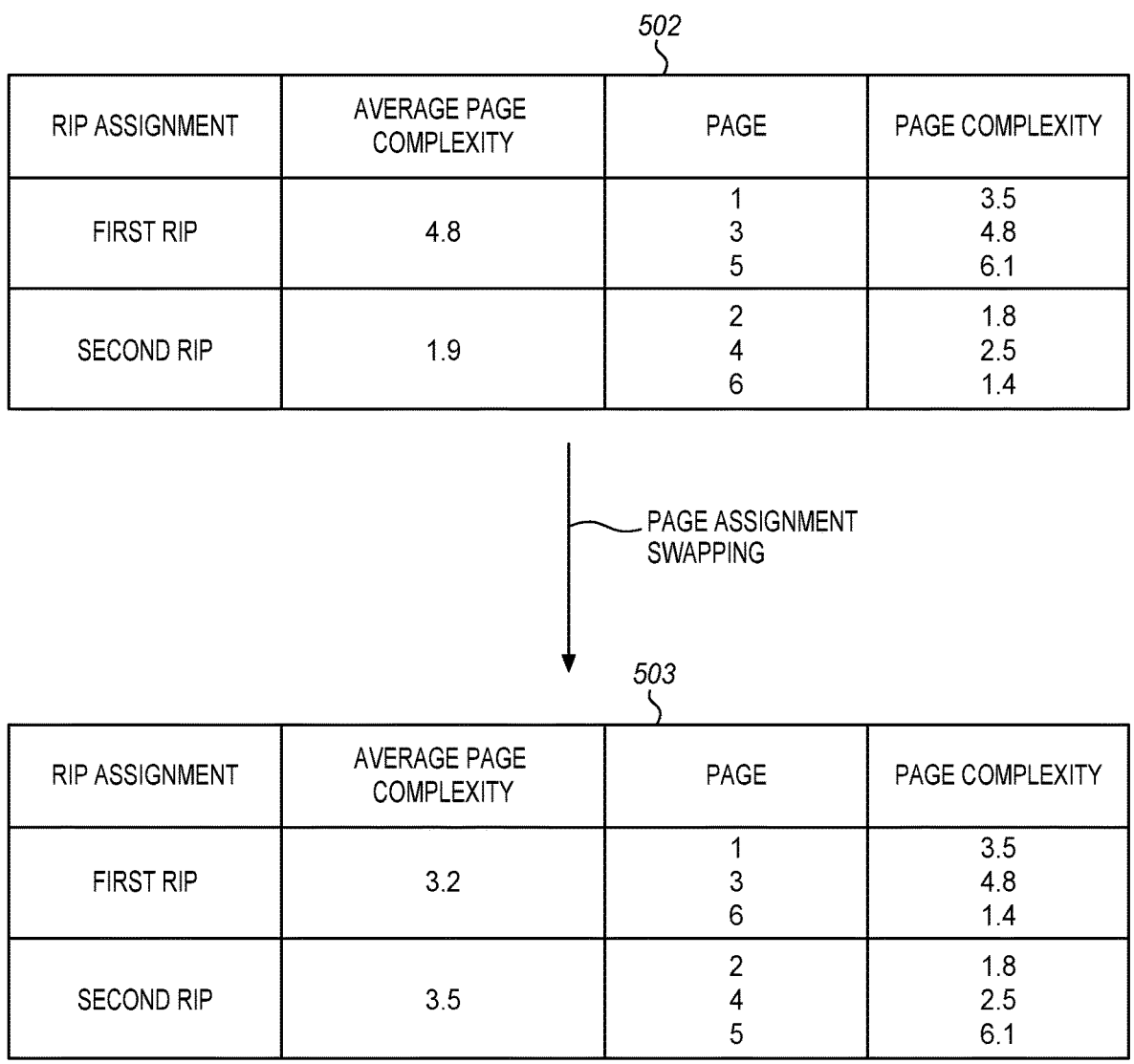
FIG. 5 depicts page complexity tables in an illustrative embodiment.

FIG. 5 depicts complexity tables 502-503 in an illustrative embodiment. FIG. 5 depicts one possible example of how scheduler 108 may perform RIP 104 scheduling based on page complexity. In the example, scheduler 108 assigns pages one, three, and five to the first RIP 104 and assigns pages two, four, and six to the second RIP 104 in complexity table 502. This initial page assignment may be performed in a round-robin manner to RIPs 104 that are available prior to analyzing the initial assignment. Further, although FIG. 5 illustrates just two RIPs 104 available for accepting pages, method 400 may apply to any number of RIPs 104. Also, any number of pages assigned to each RIP 104 may be analyzed, and therefore the current discussion of two RIPs 104 having three page assignments each is simply for the purpose of discussion.

Scheduler 108 calculates a complexity statistic (e.g., an average complexity) of logical pages 112 assigned to the first RIP 104 (see FIG. 4, step 408). In continuing with the example, scheduler 108 calculates a page complexity for pages one, three, and five, which are "3.5", "4.8", and "6.1", respectively (see FIG. 5, complexity table 502), and calculates the average complexity for pages one, three, and five as "4.8". The complexity for a page may be represented by a number of different factors, such as the number of images included in the pages, the resolution of the images, the use of embedded fonts, etc.

Scheduler 108 calculates an average complexity of logical pages 112 assigned to the second RIP 104 (see FIG. 4, step 410). In continuing with the example, scheduler 108 calculates a page complexity for pages two, four, and six, which are "1.8", "2.5", and "1.4", respectively (see FIG. 5, complexity table 502), and calculates the average complexity for pages two, four, and six as "1.9".

Scheduler 108 calculates a difference in complexity between the first average complexity and the second average complexity (see FIG. 4, step 412). Scheduler 108 determines if the difference in complexity is greater than a threshold complexity (see step 414). If the difference in complexity is not greater than the threshold complexity, then scheduler 108 determines whether logical pages 112 remain for assignment to RIPs 104 that are available. If no more of logical pages 112 remain for assignment, then method 400 ends. If logical pages 112 remain for assignment, then processing returns to step 404.

In response to scheduler 108 determining that the difference in complexity is greater than a threshold complexity value, scheduler 108 swaps page assignments between the first RIP 104 and the second RIP 104 (see step 416), and processing returns to step 408 to re-calculate a new complexity differences based on the swapped pages. Scheduler 108 evaluates the new complexity differences and continues swapping pages until the difference in complexity is less than the threshold complexity value. Scheduler 108 may swap pages randomly or according to any suitable algorithm that aids in a complexity difference reduction.

In continuing with the example illustrated in FIG. 5, the difference in the average page complexity is "2.9" (e.g., 4.8-1.9=2.9). If the threshold complexity value is one in this example, then scheduler 108 swaps page assignments between the first RIP 104 and the second RIP 104 until the average page complexity between the RIPs 104 is less than the threshold complexity. For instance, scheduler 108 may swap page five, assigned to the first RIP 104 with page six, assigned to the second RIP 104. Complexity table 503 illustrates the result of swapping page five and page six between the first RIP 104 and the second RIP 104. In continuing with the example, the average page complexity for pages assigned to the first RIP 104 is now "3.2", and the average page complexity for pages assigned to the second RIP 104 is now "3.5".

In response to scheduler 108 determining that the difference in complexity is less than the threshold complexity, that round of complexity checking is complete and scheduler 108 determines if logical pages 112 remain in print job 110 for assignment (see step 418). If no logical pages 112 remain for assignment, then method 400 ends. However, if pages remain for assignment, then processing returns to step 404, and a new round of page assignments and complexity checks occurs.

Although method 400 has been discussed independently of method 200 illustrated in FIG. 2, method 400 may be performed in combination with method 200 in some embodiments. For example, during each round of page assignments (see FIG. 3), a complexity analysis may be performed on page assignments to normalize the average page complexity for logical page 112 assignments between RIPs 104.

In some embodiments, color management instructions can be used to modify logical page 112 assignments to RIPs 104. Color management instructions generally relates to the color information specified by the pages. For example, some pages may specify a Cyan, Magenta, Yellow, Key black (CMYK) output color space, while other pages may specify a greyscale color space. Further, some pages may include various color transform instructions which may be considered when assigning logical pages 112 to RIPs 104.

Figure 6:
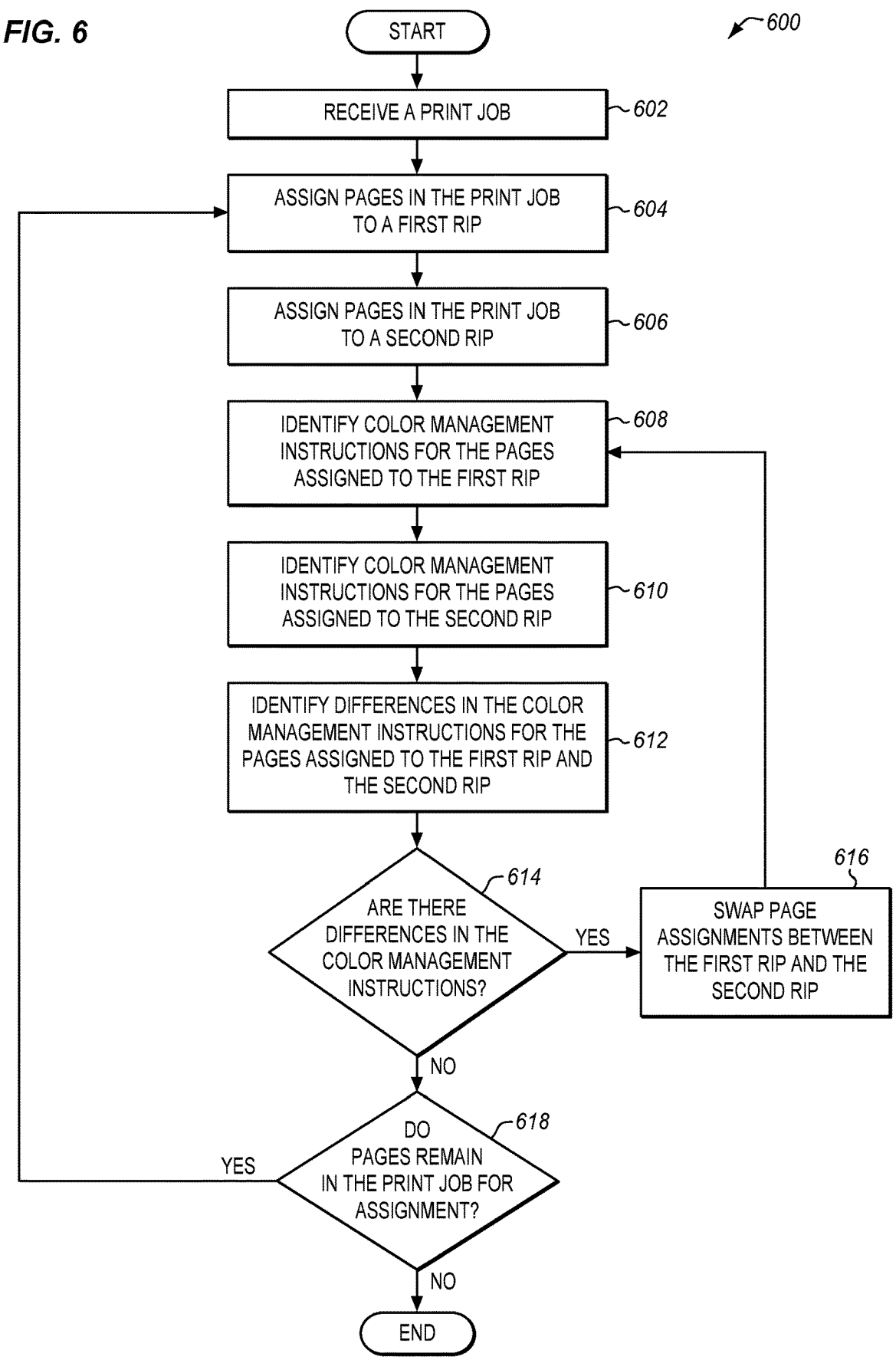
FIG. 6 is a flow chart of a method of RIP scheduling based on color management instructions in an illustrative embodiment.

FIG. 6 is a flow chart of a method 600 of RIP scheduling based on color management instructions in an illustrative embodiment. Method 600 will be discussed with respect to print controller 100 of FIG. 1, although method 600 may be performed by other systems, not shown.

Scheduler 108 receives print job 110 for processing (see FIG. 6, step 602). Step 602 may be similar to step 202 of FIG. 2, previously described. Scheduler 108 assigns one or more of logical pages 112 to a first RIP 104 that is available for processing pages (see FIG. 6, step 604) and assigns one or more of logical pages 112 to a second RIP 104 that is available for processing pages (see FIG. 6, step 606).

Figure 7:
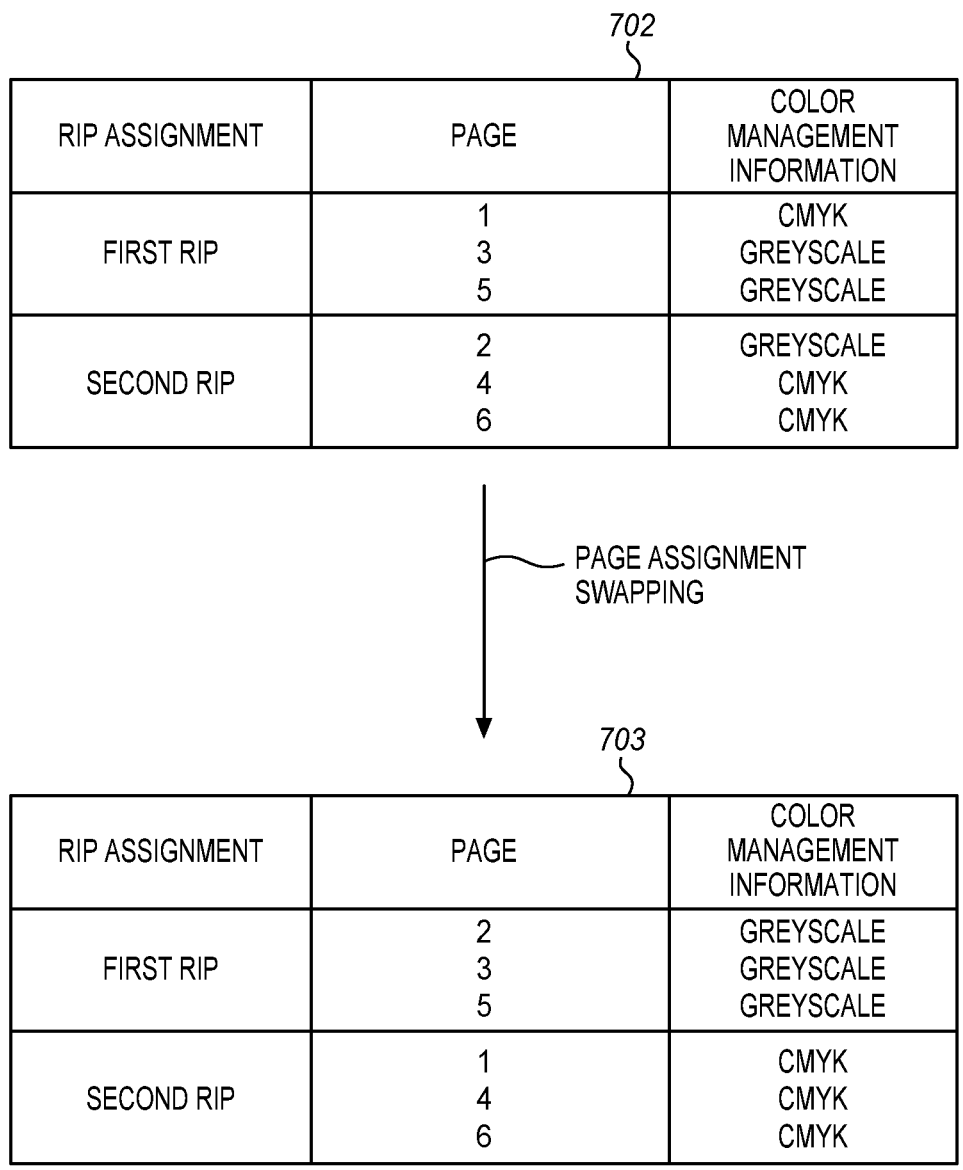
FIG. 7 depicts color management tables in an illustrative embodiment.

FIG. 7 depicts color management instructions tables 702-703 in an illustrative embodiment. FIG. 7 depicts merely one possible example of how scheduler 108 may perform RIP 104 scheduling for logical pages 112 based on color management instructions. In the example, scheduler 108 assigns pages one, three, and five to the first RIP 104 and assigns pages two, four, and six to the second RIP 104 in color management instructions table 702 in an initial round of scheduling. Further, although FIG. 7 illustrates just two RIPs 104 available for accepting pages, method 600 may apply to any number of RIPs 104. Also, any number of pages assigned to each RIP 104 may be analyzed, and therefore the current discussion of two RIPs 104 having three page assignments each is simply for the purpose of discussion.

Scheduler 108 identifies color management instructions for logical pages 112 assigned to the first RIP 104 (see FIG. 6, step 608). In continuing with the example, scheduler 108 identifies that page 1 has CMYK color management instructions, page 3 has greyscale color management instructions, and page 5 has greyscale color management instructions (see FIG. 7, color management instruction table 702). Although only two different types of color management instructions are illustrated in FIG. 7, other types of color management instructions may include color space transformations that are present in some pages but not others, etc.

Scheduler 108 identifies color management instructions for logical pages 112 assigned to the second RIP 104 (see FIG. 6, step 610). In continuing with the example, scheduler 108 identifies that page 2 has greyscale color management instructions, page 4 has CMYK color management instructions, and page 6 has CMYK color management instructions (see FIG. 7, color management instruction table 702).

Scheduler 108 identifies the differences in the color management instructions between the pages assigned to the first RIP 104 and logical pages 112 assigned to the second RIP 104 (see FIG. 6, step 612). In continuing with the example, scheduler 108 determines that page one has different color management instructions than pages three and five for the pages assigned to the first RIP 104, and determines that page two has different color management instructions than pages four and six for the pages assigned to the second RIP 104 (see FIG. 7, color management instruction table 702).

Scheduler 108 determines if there are differences in the color management instructions (see step 614). If there are differences, the scheduler 108 swaps page assignments between the first RIP 104 and the second RIP 104 (see FIG. 6, step 616), and processing returns to step 612 to identify the differences in the color management instructions between the new page assignments. Scheduler 108 continues to swap page assignments until there are no more differences in the color management instructions for the pages assigned to the first RIP 104 and the pages assigned to the second RIP 104.

In continuing with the example illustrated in FIG. 7, scheduler 108 swaps pages 1 and 2, the result of which is illustrated in color management instruction table 703. In response to swapping page assignments, the color management instructions for pages assigned to the first RIP 104 is greyscale, and the color management instructions for pages assigned to the second RIP 104 is CMYK.

In response to scheduler 108 determining that no more differences remain in the color management instructions for the pages assigned to the first RIP 104 and the pages assigned to the second RIP 104 (see step 614), color management scheduling may be considered complete for that round and scheduler 108 determines if logical pages 112 remain in print job 110 for assignment (see step 618). If no more logical pages 112 remain for assignment, then method 600 ends. However, if logical pages 112 pages remain for assignment, then processing returns to step 604, and scheduler 108 performs another round of page assignments and color management instruction checks.

Although method 600 has been discussed independently of method 200 illustrated in FIG. 2, method 600 may be performed in combination with method 200 in some embodiments. For example, during each round of page assignments (see FIG. 3), a color management instructions analysis may be performed on page assignments to organize pages having the same or similar color management instructions at the same RIP 104.

Organizing logical page 112 assignments for RIPs 104 based on color management instructions ensures that RIPs 104, which operate in parallel, have similar processing requirements, thereby preventing overloading of some of RIPs 104 over other RIPs 104 in print controller 100.

In some embodiments, scheduler 108 may perform page scheduling to RIPs 104 based on imposition exceptions that include blank sheet side post-processing marks. For example, imposition exceptions occur when print job 110 is a 1-up simplex job and print engine 101 is a duplex engine. In this case, data is generated for the blank sheet side to include the post-processing marks.

Figure 8:
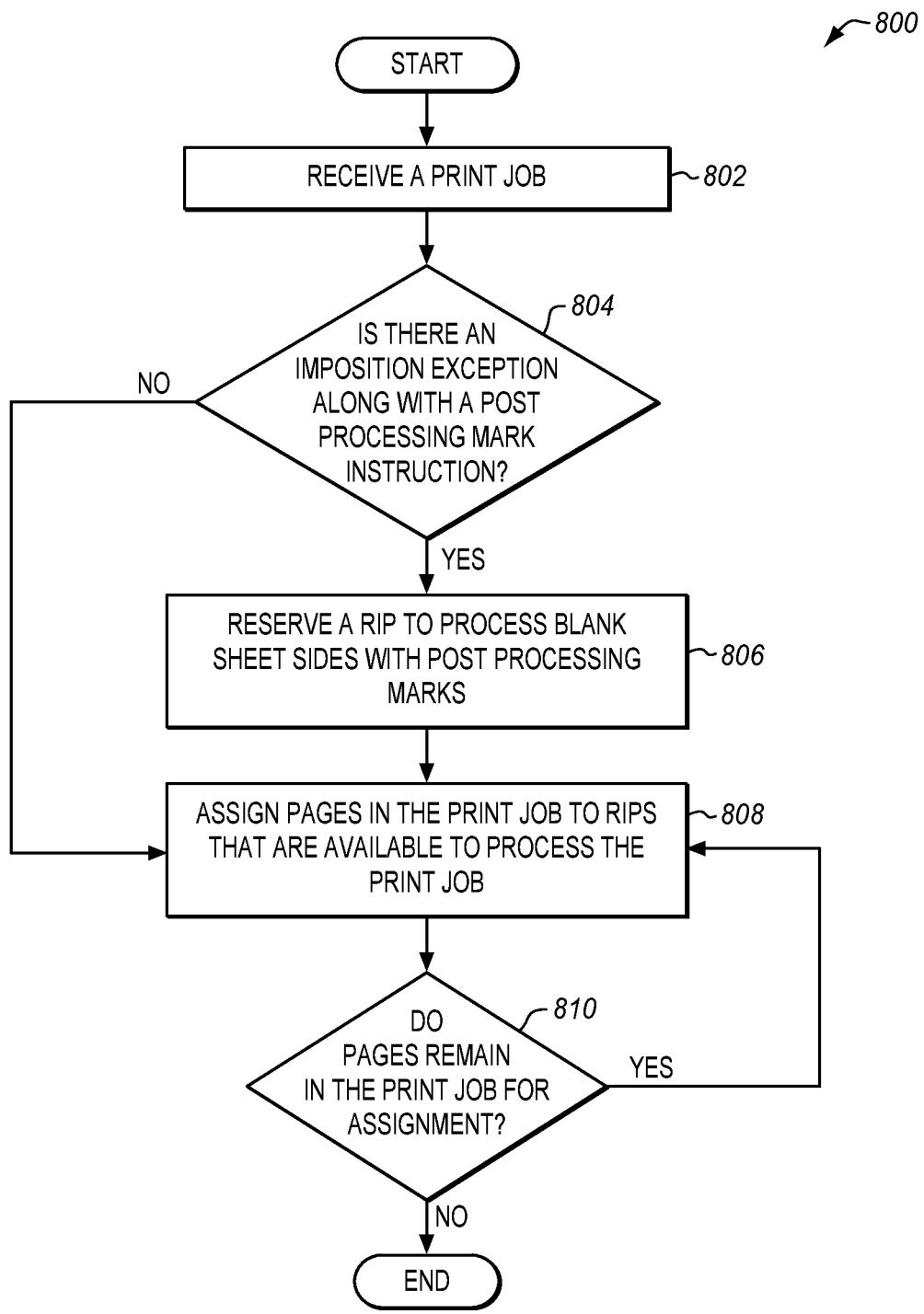
FIG. 8 is a flow chart of a method of RIP scheduling based on imposition exceptions in an illustrative embodiment.

FIG. 8 is a flow chart of a method 800 of RIP scheduling based on imposition exceptions in an illustrative embodiment. Method 800 will be discussed with respect to print controller 100 of FIG. 1, although method 800 may be performed by other systems, not shown.

Scheduler 108 receives print job 110 (see step 802). Step 802 may be similar to step 202 of FIG. 2, previously described. Scheduler 108 determines if there is an imposition exception for print job 110 (see step 804). For instance, print job 110 may be a 1-up simplex job, while print engine 101 is a duplex engine. Further, print job 110 or other printing system settings may specify that post processing marks are to be applied to the blank sheet sides sent to print engine 101. If no imposition exceptions exist for print job 110 and no post processing marks are requested for the blank sheet sides, then scheduler 108 assigns logical pages 112 in print job 110 to RIPs 104 that are available to process print job 110 (see FIG. 8, step 808). Scheduler 108 determines if all of logical pages 112 of print job 110 have been assigned to RIPs 104 (see FIG. 8, step 810). If all of logical pages 112 have been assigned, then method 800 ends. If more pages remain for assignment, then processing returns to step 808, and pages are assigned to RIPs 104 that are available until all of logical pages 112 have been assigned.

Returning to step 804, if scheduler 108 determines that there is an imposition exception along with a post-processing mark instruction for the blank sheet sides, then scheduler 108 reserves one or more RIPs 104 to process blank sheet sides with the post processing mark (see step 806). Scheduler 108 assigns logical pages 112 in print job 110 to RIPs 104 that are available to process print job 110 (see FIG. 8, step 808) and blank sheet sides with post processing marks may be assigned to RIPs 104 that are reserved. Scheduler 108 determines if logical pages 112 remain in print job 110 for assignment (see FIG. 8, step 810). If no more of logical pages 112 remain, then method 800 ends. If more pages remain for assignment, then processing returns to step 808, and pages are assigned to RIPs 104 that are available until no logical pages 112 remain for assignment.

Although method 800 has been discussed independently of method 200 illustrated in FIG. 2, method 800 may be performed in combination with method 200 in some embodiments. For example, during each round of page assignments (see FIG. 3), an imposition exception analysis may be performed on page assignments to reserve one or more RIPs 104 for blank sheet side processing, when such blank sheet sides include post-processing marks. Organizing logical page 112 assignments for RIPs 104 based on blank sheet sides with post processing marks ensures that RIPs 104, which operate in parallel, have similar processing requirements, thereby preventing the overloading of some of RIPs 104 over other RIPs 104 in print controller 100.

As discussed previously, the additional smart scheduling factors may have some factors prioritized over other factors in some embodiments. For example, when progressive page loading with page complexity analysis is used in addition with a color management instruction analysis and imposition exception analysis, then page complexity may have the highest priority, with color management instruction having the second highest priority and an imposition analysis having a third highest priority.

While combinations of progressive page loading may be combined with the smart scheduling factors previously described in any number of ways as a matter of design choice, one embodiment may comprise performing the following sequence during a scheduling round.

First, scheduler 108 performs first pass of logical page 112 assignments to RIPs 104 that are available. This first pass may be performed in a round-robin manner in some embodiments. In response to the first pass page assignments, scheduler 108 utilizes the complexity analysis (see method 400, FIG. 4) to determine whether the first pass page assignments should be modified. If the first pass page assignments are modified by the complexity analysis, then this round of page assignments is complete and RIPs 104 that are available will process their assigned logical pages 112 based on the page assignment modifications. Another round of page assignments may be performed if logical pages 112 remain for assignment.

If the first pass page assignments are not modified by the complexity analysis, then scheduler 108 utilizes the color management instruction analysis (see method 600, FIG. 6) to determine whether the first pass page assignments should be modified. If the first pass page assignments are modified by the color management instruction analysis, then this round of page assignments is complete and RIPs 104 that are available will process their assigned logical pages 112 based on the page assignment modifications. Another round of page assignments may be performed if logical pages 112 remain for assignment.

If the first pass page assignments are not modified by the color management instruction analysis, then scheduler 108 utilizes the imposition exception analysis (see method 800, FIG. 8) to determine whether the first pass page assignments should be modified. If the first pass page assignments are modified by the imposition exception analysis, then this round of page assignments is complete and RIPs 104 that are available will process their assigned logical pages 112 based on the page assignment modifications. If the first pass page assignments are not modified by the imposition exception analysis, then this round of page assignments is complete and RIPs 104 that are available will process their assigned logical pages 112 based on the first pass page assignments.

The implementation of adaptive RIP 104 scheduling as described herein improves the performance of the parallel RIP 104 process. In particular, the use of progressive RIP 104 loading during a ramp phase at a beginning of a job where a subset of the total RIPs 104 in print controller 100 are available, has been found to improve the performance of rasterizing jobs. Further, other factors may come into play to improve RIP 104 performance, either alone or in combination with progressive RIP 104 loading, such as performing RIP 104 scheduling based on average page complexity, color management instructions, imposition exceptions, etc.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 9:
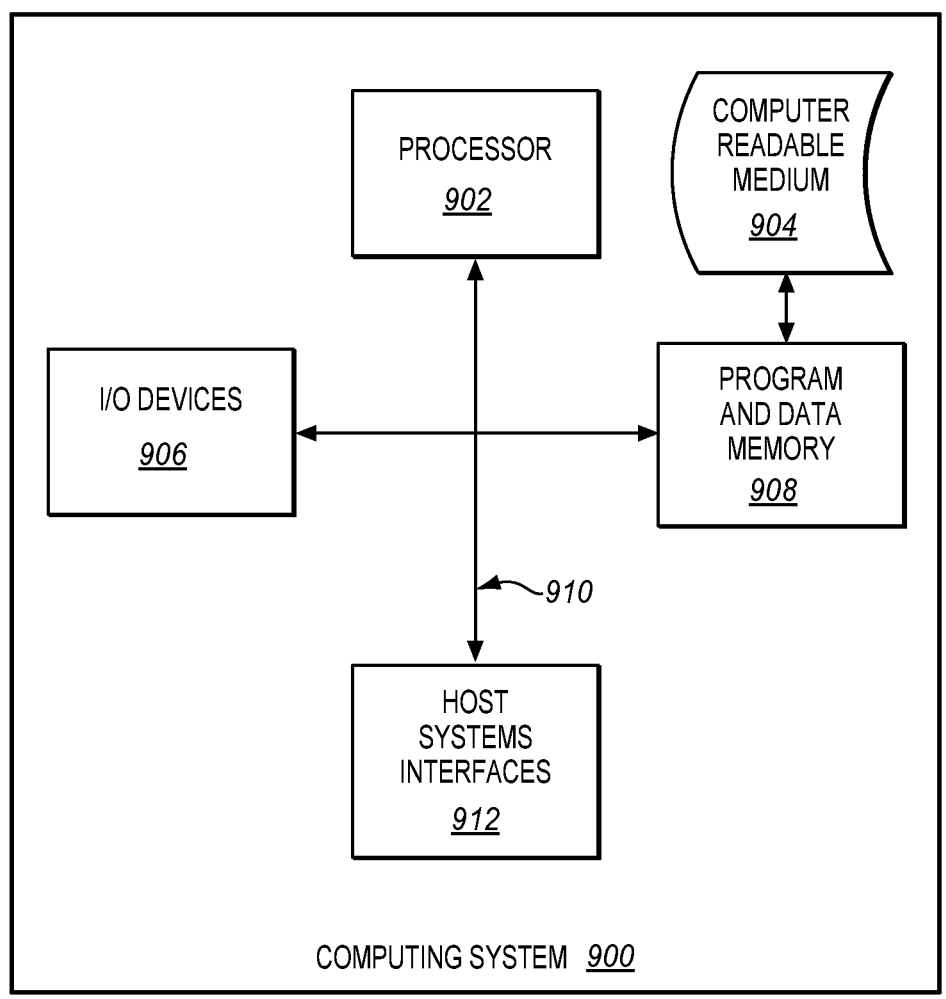
FIG. 9 is a block diagram of a computing system in which a computer readable medium may provide instructions for performing any of the functionality disclosed herein.

In one embodiment, the invention is implemented in software, which includes but is not limited to firmware, resident software, microcode, etc. FIG. 9 illustrates a computing system 900 in which a computer readable medium 904 may provide instructions for performing any of the functionality disclosed.

Furthermore, the invention can take the form of a computer program product accessible from computer readable medium 904 that provides program code for use by or in connection with a processor or any instruction execution system. For the purposes of this description, computer readable medium 904 can be any apparatus that can tangibly store the program for use by or in connection with the instruction execution system, apparatus, or device, including computing system 900.

Computer readable medium 904 can be any tangible electronic, magnetic, optical, electromagnetic, infrared, or semiconductor system (or apparatus or device). Examples of computer readable medium 904 include a semiconductor or solid-state memory, magnetic tape, a removable computer diskette, a random-access memory (RAM), a read-only memory (ROM), a rigid magnetic disk and an optical disk. Some examples of optical disks include compact disk-read only memory (CD-ROM), compact disk-read/write (CD-R/W) and DVD.

Computing system 900, suitable for storing and/or executing program code, can include one or more processors 902 coupled directly or indirectly to memory 908 through a system bus 910. Memory 908 can include local memory employed during actual execution of the program code, bulk storage, and cache memories which provide temporary storage of at least some program code in order to reduce the number of times code is retrieved from bulk storage during execution. Input/output (TO) devices 906 (including but not limited to keyboards, displays, pointing devices, etc.) can be coupled to the system either directly or through intervening IO controllers. Network adapters may also be coupled to the system to enable computing system 900 to become coupled to other data processing systems, such as through host systems interfaces 912, or remote printers or storage devices through intervening private or public networks. Modems, cable modem and Ethernet cards are just a few of the currently available types of network adapters.

Although specific embodiments were described herein, the scope is not limited to those specific embodiments. Rather, the scope is defined by the following claims and any equivalents thereof

What is claimed is:

1. An apparatus, comprising:
a plurality of Raster Image Processors (RIPs) collectively comprising a total number of RIPs that are configured to process logical pages; and
a scheduler configured to receive a print job, to determine that a number of available RIPs of the plurality of RIPs to process logical pages in the print job is less than the total number of RIPs, and to iteratively increase a number of the logical pages in the print job that are assigned to each of the available RIPs as the number of available RIPs increases over time.

2. The apparatus of claim 1, wherein:
the scheduler, responsive to determining that the number of available RIPs is less than the total number of RIPs, is configured to:
assign a first number of logical pages to each of the available RIPs, wherein the first number of logical pages is less than a maximum number of logical pages assignable to a RIP;
determine that the number of available RIPs has increased; and
assign a second number of logical pages to each of the available RIPs, wherein the second number of logical pages is higher than the first number of logical pages and less than or equal to the maximum number of logical pages.

3. The apparatus of claim 2, wherein:
the scheduler, responsive to determining that the number of available RIPs has increased to greater than a threshold number of RIPs, is configured to assign the maximum number of logical pages to each of the available RIPs.

4. The apparatus of claim 1, wherein:
the scheduler is configured to calculate a first average complexity of logical pages assigned to a first RIP of the available RIPs, to calculate a second average complexity of logical pages assigned to a second RIP of the available RIPs, to determine that a difference in complexity between the first average complexity of logical pages and the second average complexity of logical pages is greater than a threshold complexity value, and to swap logical page assignments between the first RIP and the second RIP until the difference in complexity is less than the threshold complexity value.

5. The apparatus of claim 1, wherein:
the scheduler is configured to identify color management instructions for logical pages assigned to a first RIP of the available RIPs, to identify color management instructions for logical pages assigned to a second RIP of the available RIPs, to identify differences in the color management instructions for the logical pages assigned to the first RIP and the second RIP, and to swap logical page assignments between the first RIP and the second RIP to reduce the differences in the color management instructions for the logical pages assigned to the first RIP and the color management instructions for the logical pages assigned to the second RIP.

6. The apparatus of claim 1, wherein:
the scheduler is configured to determine if the print job includes an imposition exception in addition to a post-processing instruction for blank sheet sides, and to reserve a RIP of the available RIPs to process blank sheet sides based on the post-processing instruction.

7. The apparatus of claim 1, wherein:
the plurality of RIPs is configured to process the logical pages in the print job to generate raster data,
the scheduler is configured to transmit the raster data,
the apparatus further comprises:
at least one print engine configured to receive the raster data, and to mark at least one colorant to a medium based on the raster data.

8. The apparatus of claim 1, wherein:
the scheduler, to iteratively increase the number of the logical pages in the print job that are assigned to each of the available RIPs as the number of available RIPs increases over time, is configured to:
set a size of a block of the logical pages assigned to each of the available RIPs based on the number of available RIPs, wherein the assignment is a block-cyclic distribution.

9. A method, comprising:
receiving a print job;
determining that a number of available Raster Image Processors (RIPs) to process logical pages in the print job is less than a total number of RIPs that are configured to process logical pages for print jobs; and iteratively increasing a number of the logical pages in the print job that are assigned to each of the available RIPs as the number of available RIPs increases over time.

10. The method of claim 9, wherein iteratively increasing further comprises:
assigning a first number of logical pages to each of the available RIPs, wherein the first number of logical pages is less than a maximum number of logical pages assignable to a RIP;
determining that the number of available RIPs has increased; and
assigning a second number of logical pages to each of the available RIPs, wherein the second number of logical pages is higher than the first number of logical pages and less than or equal to the maximum number of logical pages.

11. The method of claim 9, further comprising:
calculating a first average complexity of logical pages assigned to a first RIP of the available RIPs;
calculating a second average complexity of logical pages assigned to a second RIP of the available RIPs;
determining that a difference in complexity between the first average complexity of logical pages and the second average complexity of logical pages is greater than a threshold complexity value; and
swapping logical page assignments between the first RIP and the second RIP until the difference in complexity is less than the threshold complexity value.

12. The method of claim 9, further comprising:
identifying color management instructions for logical pages assigned to a first RIP of the available RIPs;
identifying color management instructions for logical pages assigned to a second RIP of the available RIPs
identifying differences in the color management instructions for the logical pages assigned to the first RIP and the second RIP; and
swapping logical page assignments between the first RIP and the second RIP to reduce the differences in the color management instructions for the logical pages assigned to the first RIP and the color management instructions for the logical pages assigned to the second RIP.

13. The method of claim 9, further comprising:
determining if the print job includes an imposition exception in addition to a post-processing instruction for blank sheet sides; and
reserving a RIP of the available RIPs to process blank sheet sides based on the post-processing instruction.

14. The method of claim 9, wherein:
the step of iteratively increasing further comprises:
setting a size of a block of the logical pages assigned to each of the available RIPs based on the number of available RIPs, wherein the assignment is a block-cyclic distribution.

15. A non-transitory computer readable medium embodying programmed instructions which, when executed by one or more processors, direct the one or more processors to:
receive a print job;
determine that a number of available Raster Image Processors (RIPs) to process logical pages in the print job is less than a total number of RIPs that are configured to process logical pages for print jobs; and
iteratively increase a number of the logical pages in the print job that are assigned to each of the available RIPs as the number of available RIPs increases over time.

16. The non-transitory computer readable medium of claim 15, wherein the programmed instructions further direct the one or more processors to:
assign a first number of logical pages to each of the available RIPs, wherein the first number of logical pages is less than a maximum number of logical pages assignable to a RIP;
determine that the number of available RIPs has increased; and
assign a second number of logical pages to each of the available RIPs, wherein the second number of logical pages is higher than the first number of logical pages and less than or equal to the maximum number of logical pages.

17. The non-transitory computer readable medium of claim 15, wherein the programmed instructions further direct the one or more processors to:
calculate a first average complexity of logical pages assigned to a first RIP of the available RIPs;
calculate a second average complexity of logical pages assigned to a second RIP of the available RIPs;
determine that a difference in complexity between the first average complexity of logical pages and the second average complexity of logical pages is greater than a threshold complexity value; and
swap logical page assignments between the first RIP and the second RIP until the difference in complexity is less than the threshold complexity value.

18. The non-transitory computer readable medium of claim 15, wherein the programmed instructions further direct the one or more processors to:
identify color management instructions for logical pages assigned to a first RIP of the available RIPs;
identify color management instructions for logical pages assigned to a second RIP of the available RIPs
identify differences in the color management instructions for the logical pages assigned to the first RIP and the second RIP; and
swap logical page assignments between the first RIP and the second RIP to reduce the differences in the color management instructions for the logical pages assigned to the first RIP and the color management instructions for the logical pages assigned to the second RIP.

19. The non-transitory computer readable medium of claim 15, wherein the programmed instructions further direct the one or more processors to:
determine if the print job includes an imposition exception in addition to a post-processing instruction for blank sheet sides; and
reserve a RIP of the available RIPs to process blank sheet sides based on the post-processing instruction.

20. The non-transitory computer readable medium of claim 15, wherein the programmed instructions, to iteratively increase the number of the logical pages in the print job that are assigned to each of the available RIPs as the number of available RIPs increases over time, further direct the one or more processors to:
set a size of a block of the logical pages assigned to each of the available RIPs based on the number of available RIPs, wherein the assignment is a block-cyclic distribution.

* * * * *